Nov. 8, 1966 J. W. SCHUCK 3,283,577
DIVIDED CAPACITANCE PROBE LEVEL GAUGE
Filed June 29, 1964
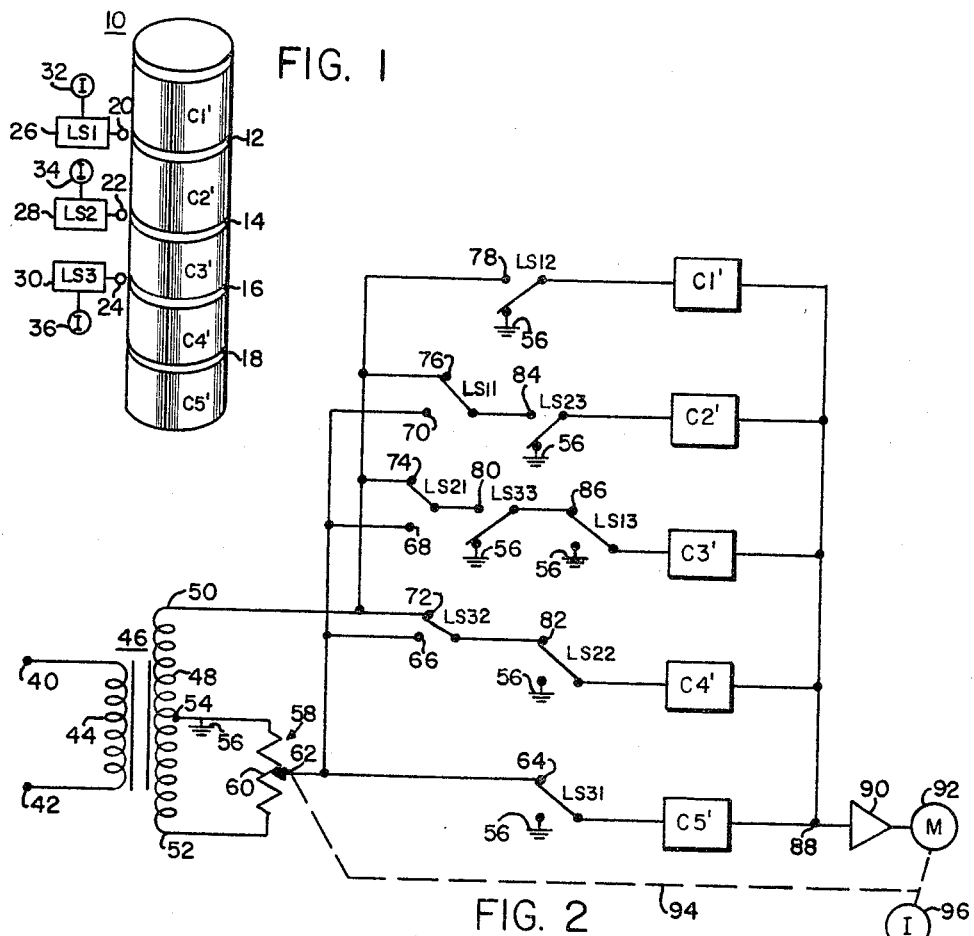
FIG. 1
FIG. 2
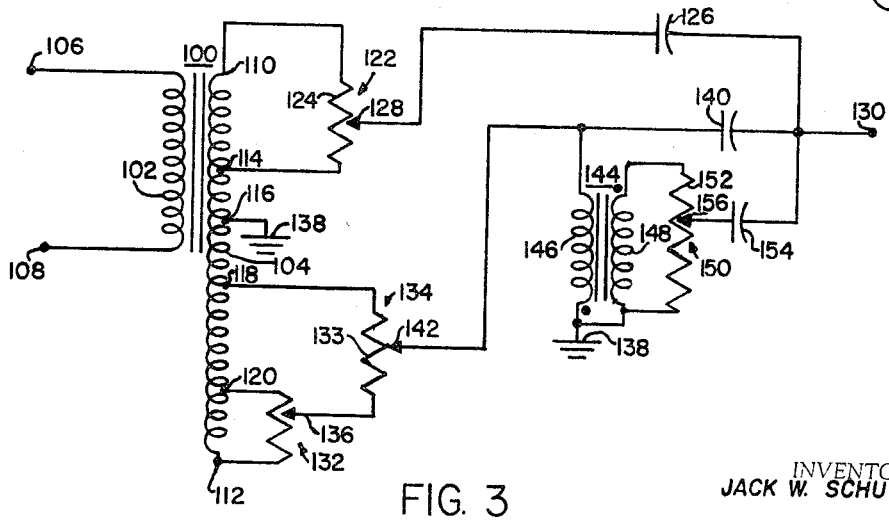
FIG. 3
INVENTOR.
JACK W. SCHUCK
BY
Bruce C Lutz
ATTORNEY

United States Patent Office 3,283,577
Patented Nov. 8, 1966

3,283,577
DIVIDED CAPACITANCE PROBE LEVEL GAUGE
Jack W. Schuck, Hopkins, Minn., assignor to Honeywell Inc., Minneapolis, Minn., a corporation of Delaware
Filed June 29, 1964, Ser. No. 378,830
10 Claims. (Cl. 73—304)

This invention is directed primarily to sensing apparatus and more particularly to fluid sensing apparatus wherein high accuracy is obtained by dividing up a capacitive probe into many segments and measuring the level at each segment independently so as to have an increased accuracy proportional to the number of segments used.

As will be noted from the following description, the invention lies in segmenting a capacitive probe so as to obtain many separate capacitive probes and thereby obtain an accuracy which is increased as each additional segment is added. The mere addition of many segmented capacitive units in series along with their associated compensating capacitors may be old in the art. However, the present invention provides an advance in the art in that the segment on the probe below, the segment being utilized as a level sensor is utilized as a dielectric compensating capacitor. In this way, compensation is obtained for the changes in dielectric of the fluid. Normally the compensator segment will be adjacent the measuring segment but can be lower if necessary. While some older fluids were relatively stable and had approximately the same changes in dielectric constant throughout the range of fluid in a small tank, present day fuels in large size tanks have definite changes in dielectric constant throughout the level of the fluid and a single compensating capacitor at the bottom of the tank is no longer usable to provide accurate level indications. Therefore, this invention lies in the use of a segment below the unit being utilized as a level sensor for use as a compensating capacitor.

It is therefore an object of this invention to provide increased accuracy fluid measuring apparatus with a minimum of components.

Other objects and advantages of this invention will be apparent from a reading of the specification and appended claims in conjunction with the drawings in which:

FIGURE 1 is a representation of the segmented capacitive probe in combination with a plurality of point level sensors;

FIGURE 2 is a schematic representation of a simplified embodiment of the complete invention; and FIGURE 3 is a representation of a bridge circuit which may be used in a practical embodiment of the invention.

For the purposes of this explanation, the probe of FIGURE 1 which is generally designated as 10 is divided into five segments C1′, C2′, C3′, C4′ and C5′. As will be realized, many more segments can be added to the amount shown or less segments can be utilized than the amount shown. Open areas between the previously mentioned segments are designated as 12, 14, 16 and 18. The open area 12 appears between segments C1′ and C2′, and the other open areas appear between the following adjacent serially positioned capacitive segments. Adjacent the open areas 12, 14 and 16 are positioned capacitive point level sensors 20, 22 and 24. These capacitive point level sensors may be similar to those shown in a Pearson Patent 3,083,572 which is assigned to the same assignee as the present invention. These capacitive point level sensors are connected respectively to level sensing circuits LS1, LS2 and LS3 which are numbered 26, 28 and 30 respectively. These level sensing circuits or units may be similar to that shown in Pearson Patent 3,042,908 also assigned to the same assignee as the present invention. These level sensing units may also have switching contacts to be later described which are also shown in the last mentioned Pearson patent. Each of these point level sensing units is connected to an indicator which is labeled I. The indicators are numbered 32, 34 and 36 and are connected to the previously mentioned point level sensing units 26–30 respectively. An indication is obtained as each of the sensing units 20–24 is covered with the fluid being measured. A point level sensor is not required at the open space 18 as the capacitive unit C5′ is only used for compensating and therefore does not constitute the first portion of level sensing indication supplied by the capacitive level sensing apparatus. As will be realized, the capacitive unit C1 is only used for level sensing while the remaining three capacitive units may be used for either level sensing or compensation depending upon the level of the fluid.

In FIGURE 2 input terminals 40 and 42 are connected across a primary winding 44 of a transformer generally designated as 46. Transformer 46 has a secondary winding 48 with end terminals 50 and 52 and a tap 54 which in this particular embodiment may be a center tap. The tap 54 is connected to ground 56. A potentiometer generally designated as 58 has a resistance winding 60 connected between tap 54 and end terminal 52 and has a variable output means 62. Output 62 is connected to a terminal 64 of a first switch LS31 and also to a terminal 66 of a switch LS32. Terminal 62 is also connected to a contact 68 of an LS2 switch LS21 and to a contact 70 of an LS1 switch LS11. End terminal 50 is connected to a second contact 72 of the LS32 switch and to a second contact 74 of the LS21 switch and further to a second contact 76 of the LS11 switch along with being connected to a first contact 78 of a second LS1 switch LS12. A second contact of the LS12 switch and of the LS31 switch is connected to ground 56. A third LS3 switch LS33 has one contact connected to ground 56 and another contact 80 connected to the moving contact of the LS21 switch. A second LS2 switch LS22 has one contact connected to ground 56 while its other contact 82 is connected to the movable contact of the LS32 switch. A third LS2 switch LS23 has one contact connected to ground 56 while the other contact 84 is connected to the movable contact or switch of the LS11 switch. A third LS1 switch LS13 has one contact connected to ground 56 while the other contact 86 is connected to the movable contact or switch portion of LS33. As shown the LS31, LS32 and LS33 switches have the movable contacts or switch connections of the switch contacting terminal 76, ground 56 and terminal 86 respectively. The capacitive segment C1′ previously mentioned in conjunction with FIGURE 1 is connected between the movable contact of LS12 and a junction point 88 which is an input to an amplifier 90. The second segment C2′ is connected between the movable contact of LS23 and the junction point 88. The third segment C3′ is connected between the movable contact of LS13 and junction point 88. The fourth segment C4′ is connected between the movable contact of LS22 and junction point 88. The fifth segment C5' is connected between the movable contact of LS31 and junction point 88. An output of amplifier 90 is connected to an input of a motor 92. The motor 92 may be merely a meter movement in itself or the combination of 90 and 92 could be a completely solid state device for feeding back a signal to the bridge circuit utilizing transformer 46 in a manner similar to that shown in a copending application to Valentine 320,816 which was filed November 1, 1963, now Patent 3,237,178 and assigned to the same assignee as the present invention. The output of motor 92 comprises a mechanical linkage 94 which adjusts the variable output 62 of potentiometer 58 and also provides an indication on an indicator 96.

In FIGURE 3 a transfer 100 has an input winding 102 and a secondary winding 104. This transformer provides the same function as the transformer 46 in FIGURE 2. Input terminals 106 and 108 are connected to the ends of winding 102. Winding 104 has ends or leads 110 and 112. Winding 104 also has taps 114, 116, 118 and 120. A potentiometer generally designated as 122 has a resistance winding 124 connected between end 110 and tap 114. A capacitive unit or condition sensing means 126 is connected between a wiper 128 of the potentiometer 122 and an output terminal 130. The capacitor 126 is a tank unit capacitor or a level measuring capacitor and corresponds to one of the capacitors such as C1 in FIGURE 2. The potentiometer 122 is an empty adjustment potentiometer which will adjust the voltage applied to capacitor 126 to obtain a zero reading on the indicator 96 of FIGURE 2. A potentiometer 132 has a resistance element connected between end 112 and tap 120. A resistance winding or element 133 of a potentiometer generally designated as 134 is connected between tap 118 and a wiper 36 of potentiometer 132. Tap 116 is connected to ground 138. A capacitor 140 is connected between a wiper 142 of potentiometer 136 and output terminal 130. A transformer or phase inversion means generally designated as 144 has a primary winding 146 and a secondary winding 148. The primary winding 146 is connected between wiper 142 and ground 138. A potentiometer generally designated as 150 has a resistance winding 152 connected between the ends of secondary winding 148. One end of secondary winding 148 is also connected to ground 138. A capacitor 154 is connected between a wiper 156 of potentiometer 150 and output terminal 130. The capacitor 140 is a compensator capacitor which will compensate for changes in dielectric of the fluid between the electrodes of tank unit 126. The capacitor 154 compensates for the empty capacitance of the compensator capacitor 140.

OPERATION

As previously mentioned the invention lies partly in the use of some of the segments of a segmented capacitive probe for both level measurement and at a different fluid level for dielectric compensation. The circuitry is adjusted such that when one capacitive segment is being utilized for level measurement, the segment immediately below this segment may be utilized as a dielectric compensator. In this way a second capacitive probe is eliminated for use as a dielectric compensator and further in this way the fluid which is being used in the dielectric compensator is very close to the same dielectric characteristics as the fluid measured by the level indicating capacitive segment.

The circuitry of FIGURE 2 shows the circuit when the fluid is somewhere between the points or free spaces 16 and 18. The segment C5' will lie in a recess in the tank so that it will always be covered with fluid but will not provide any indication of fluid level. Each of the LS switches is inactive and this is due to the fact that fluid does not cover any of the sensors such as 20–24 of the point level sensing units. Therefore, in this connection C4' is being utilized as the level sensor while C5' is being utilized as a dielectric compensator. If the fluid rises so as to cover the sensor 24, LS3 will operate thereby moving the movable contacts on each of the LS3 switches. Upon the operation of LS3, an indicator 36 will light or otherwise show on some type of display that the second segment C3' is being used for measurement of fluid while C4' is being used for dielectric compensation. As will be noted, the operation of the LS3 switches will disconnect C5' and connect C3' and C4' into the circuit. Although a detailed recitation is not believed necessary, it may be determined from observation of the circuitry of FIGURE 2 that as the fluid rises past free point 14 on the probe 10 of FIGURE 1, C4' will be disconnected from the circuit while C2' and C3' are inserted. Upon a further rise in the circuit it may be noted that C1' and C2' are being utilized in the bridge circuit. The indication obtained will therefore be a combination of indicatons from the various LS switches and also from the indicator 96 which will indicate a level of the fluid on the particular segment being utilized as a level sensor FIGURE 3 illustrates a somewhat refined or practical version of the simplified bridge circuit shown in FIGURE 2. The circuitry shown in FIGURE 2 is adequate for illustrative purposes, but, to produce a practical embodiment a somewhat more complicated version must be used to obtain accurate information. FIGURE 3 is one embodiment illustrating a more accurate version. It may be assumed that potentiometer wiper 142 acts as a rebalance potentiometer in the same fashion as wiper 62 of FIGURE 2. For this particular circuit it will be assumed that the potential below ground at tap 118 times the capacitance of capacitor 140 due to fluid between the electrodes will be substantially equal to the empty capacitance of capacitor 126 times a set voltage on the wiper 128. The wiper 128 on potentiometer 122 is therefore set in empty conditions so that when the compensator capacitor 140 covered with fluid, the wiper 142 is driven toward the end of potentiometer 134 which is connected to tap 118. This provides the empty adjustment of the circuit. The capacitor 126 is then covered with fluid to represent the full condition and potentiometer wiper 136 of potentiometer 132 is then adjusted so as to provide a full indication on indicator 96 and also to place the rebalance potentiometer wiper 142 at the end closest to the connection of wiper 136. In this position, the voltage at wiper 142 times the capacitance of capacitor 140 due to the fluid is equal to the voltage on wiper 128 times the capacitance of capacitor 126 due to both its empty capacitance and to the additional capacitance created by the fluid between the plates. The potentiometer wiper 156 of potentiometer 150 is adjusted so that the voltage on wiper 156 times the capacitance of capacitor 154 is equal to the empty capacitance of capacitor 140 times the voltage on wiper 142.

As will be realized, the circuitry shown in FIGURE 3 is only one embodiment of a circuit which may be utilized to perform the present invention. It will also be readily apparent to those skilled in the art that mass sensing means may also be obtained using the teachings of this invention and other patents such as Hermanson 2,769,338 which issued November 6, 1956, and is assigned to the same assignee as the present invention or Franzel et al. 3,037,385 which issued June 5, 1962, and is also assigned to the same assignee as the present invention.

Further, this invention is not limited to the particular embodiment shown but to any embodiment whereby some of the segments on a segmented capacitive probe are used at alternate levels of fluid as either a level sensor or as a dielectric compensator. It is not necessary to use the level switches as shown in this embodiment if more sophisticated electronics are desired but this is one of the simpler ways of performing the function.

The simplified version shown eliminates series resistors and for ease of explanation assumes that each of the segments of the probe C10 are of equal capacitive value.

However, with series resistors and somewhat more complicated switching, the circuitry may be modified to utilize unequal capacitance segments for either level or mass sensing.

While specific terminology has been resorted to for clarity in explanation of this invention, it is to be realized that the invention is quite broad as applied to fluid sensing and is to be limited only by the scope of the appended claims.

I claim as my invention:

1. Liquid level measuring apparatus comprising, in combination:
- a plurality of equal capacitance level sensing capacitor units for use in determining the level of liquid in a container, said plurality of units each having a commonly connected electrode and a second electrode, said plurality of capacitor units being further characterized by being situated in a vertical line such that the individual capacitor units are covered in succession as the liquid being measured rises;
- transformer means, including tap means, for supplying power of a first phase at one end terminal and a phase opposite said first phase at the other end terminal;
- reference potential means connected to said top means;
- rebalance means, including variable output means, connected between said one end terminal and said reference potential, said variable output means of said rebalance means providing output signals of varying amplitudes and of a first phase;
- a plurality of point level sensing means, including switching means, located at points intermediate the individual units of said plurality of capacitor units, said switching means of each of said point level sensing means providing a switching action as the level of liquid being sensed covers a sensor of said point level sensing means;
- means connecting said switching means to said second end terminal of said transformer means, said output means of said rebalance means, and said second electrodes of said plurality of capacitor units so that said other end terminal of said transformer means and said output means of said rebalance means are connected to adjacent capacitor units, the capacitor unit connected to said output means of said rebalance means serving as a compensator capacitor and the capacitor unit connected to said other end terminal serving as a level sensing unit;
- amplifier means, including input and output means connected by said input means to said commonly connected electrodes of said capacitor units for receiving a signal therefrom;
- means connecting said output means of said amplifier means to said variable output means of said rebalance means for adjusting said variable output means to provide a minimum input to said amplifier means; and
- indicator means connected to said amplifier means and to said point level sensing means for providing an output indication of the capacitor unit supplying liquid level indications and an output indication of the level of liquid between the plates of the capacitor unit supplying liquid level indications.

2. Fluid level measuring apparatus comprising, in combination:
- a plurality of capacitance level sensing capacitor units for use in determining the level of a fluid, said plurality of units each having a commonly connected electrode and a second electrode, said plurality of capacitor units being further characterized by being situated vertically such that the individual capacitor units are covered in succession as the fluid being measured rises;
- transformer means, including tap means, for supplying power of a first phase at one end terminal and a second phase at the other end terminal;
- rebalance means, including variable output means, connected between said one end terminal and said tap of said transformer means, said variable output means of said rebalance means providing output signals of varying amplitudes and of a first phase;
- a plurality of point level sensing means, including switching means, located at levels intermediate the individual units of said plurality of capacitor units, said switching means of each of said point level sensing means providing a switching action as the level of fluid being measured rises to predetermined levels;
- means connecting said switching means to said second end terminal of said transformer means, said output means of said rebalance means, and said second eletrodes of said plurality of capacitor units so that said other end terminal and said output means of said rebalance means are connected to adjacent capacitor units, the capacitor unit connected to said output means of said rebalance means serving as a compensator capacitor and the capacitor unit connected to said other end terminal serving as a level sensing unit;
- amplifier means, including output means, connected to said commonly connected electrodes of said capacitor unts for receiving a signal therefrom;
- means connecting said output means of said amplifier means to said variable output means of said rebalance means for adjusting said variable output means to provide a minimum input to said amplifier means; and
- indicator means connected to said amplifier means and to said point level sensing means for providing an output indication of the capacitor unit supplying liquid level indications and an output indication of the level of fluid between the plates of the capacitor unit supplying fluid level indications.

3. Fluid level measuring apparatus comprising, in combination:
- a plurality of level sensing capacitor units for use in determining the level of a fluid, said plurality of units each having a commonly connected electrode and a second electrode, said plurality of capacitor units being further characterized by being situated such that the individual capacitor units are covered successively as the fluid being measured rises;
- transformer means for supplying power;
- rebalance means, including variable output means, connected to said transformer means, said variable output means of said rebalance means providing output signals of varying amplitudes;
- point level sensing means, including switching means, for sensing predetermined levels intermediate the individual units of said plurality of capacitor units, said switching means of said point level sensing means providing a switching action as the level of the fluid being sensed reaches each predetermined level;
- means connecting said switching means to said transformer means, said output means of said rebalance means, and said second electrodes of said plurality of capacitor units so that signals of different phases are supplied from said rebalance means and said transformer means to adjacent capacitor units, the lower capacitor unit serving as a compensator and the upper capacitor unit being responsive to level changes;
- further means connecting said commonly connected electrodes of said capacitor units to said variable output means of said rebalance means for adjusting said variable output means to provide a minimum input through said capacitor units to said further means; and indicator means connected to said further means for providing an output indication responsive to fluid level.

4. Fluid level indicating apparatus comprising, in combination:

first signal supplying means for supplying a first signal of a first phase and of variable amplitude;

second signal supplying means for supplying a second signal of a second phase;

capacitive fluid level sensor means comprising a segmented probe having a plurality of inputs connected to a plurality of vertically aligned capacitive units, said capacitive sensor means including a common output;

point level sensing means, including a plurality of sensors and switching means, for providing a switching function and an indication as each individual sensor of said point level sensing means is covered with the fluid being measured;

means attached to said point level sensing means for positioning the individual sensors thereof at predetermined levels corresponding to points intermediate said capacitive units of said segmented probe;

means connecting said switching means to said first and second signal supplying means and to said inputs of said capacitive fluid level sensor means, two adjacent capacitive units of said segmented probe being connected to said signal supplying means at a given time; and rebalance means connected between said common output of said capacitive fluid level sensing means and said first signal supplying means for varying the amplitude of the first signal to minimize the amplitude of any signal appearing at the common output of said capacitive fluid level sensor means, said rebalance means also providing an output indicative of the capacitive unit being utilized as a level sensor and the level of the fluid contiguous that capacitive unit.

5. Indicating apparatus comprising, in combination:

first signal supplying means for supplying a first signal;

second signal supplying means for supplying a second signal;

capacitive fluid level sensor means comprising a segmented probe having a plurality of inputs connected to a plurality of vertically aligned capacitive units, said capacitive sensor means including a common output;

point level sensing means, including a plurality of sensors and switching means, for providing a switching function and an indication as the fluid being measured reaches predetermined levels corresponding to vertical points intermediate said capacitive units;

means connecting said switching means to said first and second signal supplying means and to said inputs of said capacitive fluid level sensor means, two adjacent capacitive units of said segmented probe being connected to said signal supplying means at a given time; and rebalance means connected between said common output of said capacitive fluid level sensing means and said first signal supplying means for varying the amplitude of the first signal to minimize the amplitude of any signal appearing at the common output of said capacitive fluid level sensor means, said rebalance means also providing an output indicative of the capacitive unit being utilized as a level sensor and the level of the fluid contiguous that capacitive unit.

6. Condition sensing apparatus comprising, in combination:

capacitive probe means having a plurality of equal capacitive segments situated with respect to a longitudinal dimension;

rebalance bridge circuit means including rebalance means and indicating means for providing fluid level outputs;

switching means in circuit with said bridge circuit means and said capacitive probe means for connecting a capacitive segment of said plurality of segments at a level corresponding to the level of the fluid being measured in one leg of said bridge circuit for providing fluid level information and for connecting an adjacent lower segment in another leg of said bridge circuit means for providing dielectric compensation; and means connecting said capacitive probe means to said rebalance means of said rebalanceable bridge circuit means 7. Condition sensing apparatus comprising, in combination:

probe means having a plurality of environment sensitive segments situated with respect to a longitudinal dimension;

rebalanceable bridge circuit means including rebalance means and indicating means for providing fluid quantity outputs;

switching means in circuit with said bridge circuit means and said probe means for connecting a environment sensitive segment of said plurality of segments at a level corresponding to the level of the fluid being measured in one leg of said bridge circuit for providing fluid quantity information and for connecting an adjacent lower segment in another leg of said bridge circuit means for providing compensation; and means connecting said probe means to said rebalance means of said rebalanceable bridge circuit means.

8. Control apparatus comprising, in combination:

first signal supplying means for supplying a first signal;

second signal supplying means for supplying a second signal;

condition sensing means comprising a segmented probe including a plurality of inputs connected to a plurality of aligned sensor units, said sensing means including an output;

switching means for providing switching functions and indications as each individual sensor unit of said sensing means is used for condition sensing;

means connecting said switching means to said first and said second signal supplying means and to said inputs of said condition sensing means, two sensor units of said segmented probe being connected to said signal supplying means at a given time, one of said units being used as a condition sensor and the other as a compensator for the condition sensor unit; and rebalance means connected between said output of said sensing means and said first signal supplying means for varying the amplitude of the first signal to minimize the amplitude of any signal appearing at the output of said condition sensing means.

9. Compensated condition sensing apparatus comprising, in combination:

first and second signal supplying means for simultaneously supplying first and second signals of first and second phases;

a plurality of sensing means, each individual sensing means of said plurality of sensing means requiring compensation for changes in the environment other than a condition being sensed;

switching means connected to said plurality of sensing means and to said first and second signal supplying means for supplying a first signal to a first sensing means of said plurality and said second signal to an adjacent sensing means to be used as a compensating element, the individual sensing means of said plurality to be supplied with said first signal being dependent upon the condition being sensed; and output means connected to said sensing means for providing an output indicative of the condition being sensed.

10. Compensated condition sensing apparatus comprising, in combination:
  signal supplying means for simultaneously supplying first and second signals of first and second phases;
  a plurality of sensing means, each individual sensing means of said plurality of sensing means requiring compensation for changes in the environment other than a condition being sensed;
  switching means connected to said plurality of sensing means and to said first and second signal supplying means for supplying a first signal to a first sensing means of said plurality and said second signal to another sensing means to be used as a compensating element; and
  output means connected to said sensing means for providing an output indicative of the condition being sensed.

References Cited by the Examiner

UNITED STATES PATENTS 2,963,908 12/1960 Shawhan _____ 73—304
3,010,320 11/1961 Sollecito _____ 73—304

LOUIS R. PRINCE, *Primary Examiner.*

S. C. SWISHER, *Assistant Examiner.*